United States Patent
Vigild et al.

(10) Patent No.: US 9,945,331 B2
(45) Date of Patent: Apr. 17, 2018

(54) CLEANING OF A CHARGE-AIR COOLER IN A SYSTEM WITH EXHAUST GAS RECIRCULATION ARRANGEMENT

(71) Applicant: Ford Global Technologies, LLC, Dearborn, MI (US)

(72) Inventors: Christian Winge Vigild, Aldenhoven (DE); Wilbert Hemink, Landgraaf (NL); Daniel Roettger, Eynatten (BE); Andreas Kuske, Geulle (NL)

(73) Assignee: Ford Global Technologies, LLC, Dearborn, MI (US)

( * ) Notice: Subject to any disclaimer, the term of this patent is extended or adjusted under 35 U.S.C. 154(b) by 61 days.

(21) Appl. No.: 15/018,108

(22) Filed: Feb. 8, 2016

(65) Prior Publication Data

US 2016/0250671 A1    Sep. 1, 2016

(30) Foreign Application Priority Data

Feb. 26, 2015   (DE) .................. 10 2015 203 473

(51) Int. Cl.

| | |
|---|---|
| *F02B 29/04* | (2006.01) |
| *F02M 26/35* | (2016.01) |
| *B08B 9/00* | (2006.01) |
| *F28F 17/00* | (2006.01) |
| *F02B 77/04* | (2006.01) |
| *F02M 26/06* | (2016.01) |
| *F28F 27/00* | (2006.01) |
| *F28G 9/00* | (2006.01) |

(Continued)

(52) U.S. Cl.
CPC ............... *F02M 26/35* (2016.02); *B08B 9/00* (2013.01); *F02B 29/0462* (2013.01); *F02B 29/0468* (2013.01); *F02B 77/04* (2013.01); *F02M 26/06* (2016.02); *F28F 17/005* (2013.01); *F28F 27/00* (2013.01); *F28G 9/00* (2013.01); *F28G 15/003* (2013.01); *F02D 41/0047* (2013.01); *F28D 2021/0082* (2013.01); *Y02T 10/146* (2013.01)

(58) Field of Classification Search
CPC .... F02M 26/35; F02M 26/06; F02B 29/0462; F02B 29/0468; F28F 17/005; F28F 27/00; F28G 9/00; F28G 15/008; F02D 41/0047; F28D 2021/0082
USPC ......................... 123/568.11–568.32, 542, 563
See application file for complete search history.

(56) References Cited

U.S. PATENT DOCUMENTS

| | | | |
|---|---|---|---|
| 6,394,076 B1 * | 5/2002 | Hudelson ................. | F01P 9/06 123/41.31 |
| 6,675,781 B1 * | 1/2004 | Markley ............. | F02B 29/0462 123/542 |

(Continued)

FOREIGN PATENT DOCUMENTS

| | | |
|---|---|---|
| DE | 102008049625 A1 | 4/2010 |
| DE | 102009042981 A1 | 4/2010 |

(Continued)

*Primary Examiner* — Marguerite McMahon
(74) *Attorney, Agent, or Firm* — Julia Voutyras; McCoy Russell LLP

(57) ABSTRACT

Methods and systems are provided for cleaning a water-cooled charge-air cooler. In one example, a method may include condensing water present in the supplied charge-air and exhaust gas which may exist in gaseous and droplet form, and purging the condensate along with the exhaust gas. A system for carrying out the above mentioned method is also provided.

9 Claims, 3 Drawing Sheets

(51) Int. Cl.
  *F28G 15/00*     (2006.01)
  *F02D 41/00*     (2006.01)
  *F28D 21/00*     (2006.01)

(56) References Cited

U.S. PATENT DOCUMENTS

| | | | | |
|---|---|---|---|---|
| 8,307,643 | B2* | 11/2012 | Quinn | F02B 29/0468 123/563 |
| 2003/0079728 | A1* | 5/2003 | Marsh | F01P 3/20 123/563 |
| 2010/0077995 | A1* | 4/2010 | Buia | F02B 29/0468 123/542 |
| 2010/0242928 | A1* | 9/2010 | Fasold | B01D 53/40 123/568.12 |
| 2012/0055151 | A1* | 3/2012 | Durand | F01M 1/00 60/599 |
| 2013/0306040 | A1* | 11/2013 | Yamada | F02B 29/04 123/563 |
| 2015/0047340 | A1* | 2/2015 | Ulrey | F02B 47/08 60/600 |
| 2015/0285128 | A1* | 10/2015 | Cardwell | F02B 29/0468 60/599 |
| 2015/0369119 | A1* | 12/2015 | Sharma | F02B 29/0468 60/599 |

FOREIGN PATENT DOCUMENTS

| | | |
|---|---|---|
| DE | 102007061049 B4 | 12/2013 |
| EP | 2213859 A2 | 8/2010 |
| EP | 2111504 B1 | 11/2010 |

* cited by examiner

CLEANING OF A CHARGE-AIR COOLER IN A SYSTEM WITH EXHAUST GAS RECIRCULATION ARRANGEMENT

CROSS REFERENCE TO RELATED APPLICATION

The present application claims priority to German Patent Application No. 102015203473.9, filed Feb. 26, 2015, the entire contents of which are hereby incorporated by reference for all purposes.

FIELD

The present description relates generally to methods and systems for cleaning a charge-air cooler in a motor vehicle.

BACKGROUND/SUMMARY

As a result of compression of the combustion air in a turbocharger of a motor vehicle, the air is heated. Hot air requires a larger volume within a container relative to cold air and in order to provide the greatest possible air mass for combustion in an internal combustion engine, an thus to increase the power and efficiency of said internal combustion engine, the temperature of the supplied air may be reduced further by way of charge-air coolers. Charge-air coolers may typically be arranged within an intake tract of an engine between a turbocharger and an inlet valve. In a case where water-cooled charge-air coolers (WCAC), are used, the heat may be released into a dedicated water-cooling circuit. In this case, a cooling circuit comprises not only the WCAC, but also a cooling radiator 2 and a pump 3 for the cooling fluid, water.

The charge air may then be mixed with the exhaust gas of an internal combustion engine by way of an exhaust gas recirculation (EGR) arrangement. This may serve primarily for reducing the emissions of nitrogen Oxides (NOx). Furthermore, in a case of Otto-cycle engines, exhaust-gas recirculation may be conductive to reducing charge-exchange losses, and thereby may also reduce fuel consumption. In a case of low-pressure EGR, an exhaust gas may be discharged downstream of an exhaust-gas after-treatment arrangement, and may be introduced upstream of a turbo compressor. Some of the exhaust gas may then flow from a turbo compressor into the internal combustion engine through a charge-air cooler.

However, the inventors herein have recognized potential issues with such systems. As one example, one potential drawback presented by charge-air coolers is that condensation water may form within the coolers. A feature of the present disclosure provides that water which may be contained in gaseous and droplet liquid form within inducted combustion air and/or within recirculated exhaust gas may be condensed.

The exhaust gas in particular, may also comprise other substances that may react with the condensation water in a way that produces acid products. In instances such as this, it may for example, be possible for sulfur compounds within an exhaust gas to react in a way that produces sulfuric acid, wherein the pH value may be between 1.5 and 2. This may lead to corrosion of the metal constituents of the charge-air cooler (cooling ribs, cooling hoses, and other parts comprising aluminum or steel), whereby the durability thereof may be jeopardized. It may also be possible, for example, for constituent parts comprised of brazing materials used during the production of the charge-air cooler to become detached and to cause punctiform corrosion. It is thus important for condensation water to be substantially removed from the charge-air cooler in order to limit the risk of corrosion damage. Furthermore, in a rest state of an engine, condensation water may pass from the charge-air cooler to a point upstream of the swept volume of the internal combustion engine, and here, may result in starting problems and serious potential engine damage.

In one example, the issues described above may be addressed by a method for an internal combustion engine with an exhaust-gas recirculation arrangement, wherein a cooler device which may be connected via a coolant circuit to a charge-air cooler imparts a cooling effect through maximum cooling of a charge-air cooler. In this way, the water that may be present in a gaseous state or in droplet liquid form within a charge-air cooler may be condensed and furthermore, with the condensate that may be present, as it runs off under the action of the force of gravity into a lower region of a charge-air cooler, condensation water may be purged from a charge-air cooler, and in the process, substances with a potentially corrosive action may be washed out.

It will be appreciated that in the present disclosure, the term "condensate" may be used synonymously with condensed water and the terms may be used interchangeably.

As one example, the method described herein, may be further desirable in part because the removal of condensate in the shut-down state of a motor vehicle, may provide that no condensation water may pass from a charge-air cooler to provided inlet valves and may not result in drawbacks such as difficulty starting the engine and/or engine damage.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for cleaning a charge-air cooler in a motor vehicle having an internal combustion engine.

In one example embodiment of the present description, a method a system may be provided in which condensation water that forms within a charge-air cooler may be discharged. An example method for the above system is also provided. As one example, a method is provided for cleaning a water-cooled charge-air cooler for an internal combustion engine with exhaust-gas recirculation arrangement, wherein a cooler device which may be connected via a coolant circuit to the charge-air cooler may then impart a cooling effect through maximum cooling of the charge-air cooler.

The method may exhibit improved cooling characteristics due to water that may be present in the gaseous state or in droplet form within the charge-air cooler being condensed and furthermore, with the condensate that is present, as it runs off under the action of the force of gravity into a lower region of the charge-air cooler, condensation water may be purged from the charge-air cooler. In the process of purging water and air, substances with a potentially corrosive action may be washed out. Further, due to the removal of the condensate in the shut-down state of the motor vehicle, no condensation water may pass from the charge-air cooler into the inlet valves which may cause potentially disadvantageous starting problems and/or engine damage. In one example embodiment, water is used as the coolant.

The cooling effect of the above described method may be imparted over a period of time until an increased amount of water in gaseous and/or droplet form within the charge-air cooler may have reverted back into condensate form. In other words, the charge-air cooler may be intensely cooled such that no water or at least a reduced amount of water, in gaseous and/or droplet form may be present within the charge-air cooler.

As one embodiment of the disclosed method, enhanced cooling of the charge-air cooler by way of the cooler device or system may be performed in the presence of low ambient temperatures. For example, it may be possible for the cooling radiator of a vehicle to be activated when it would not be required due to particularly low ambient temperatures.

In another representation of the method described herein, improved cooling of the charge-air cooler by way of the cooler system may be performed at high vehicle speeds. In this case, the relative wind contributions, in addition to the activated cooling radiator, to the improved effective cooling of the charge-air cooler.

Figure 1:
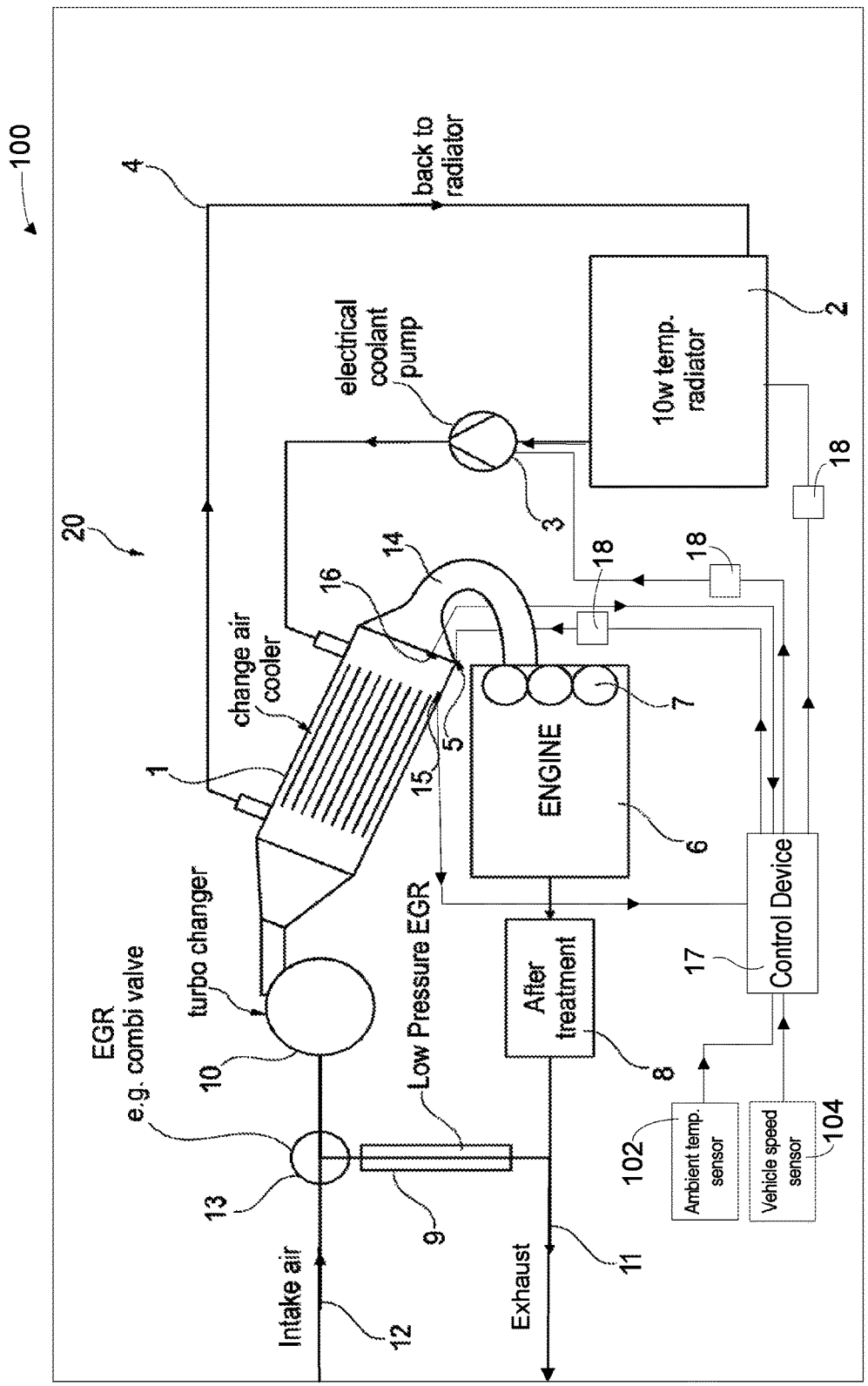
FIG. 1 shows an embodiment of the system according to the present disclosure.

In one example embodiment of a system 20 for cleaning a charge-air cooler, as illustrated in FIG. 1, the system 20 may be integrated into a vehicle 100. The system 20 may comprise a cooling circuit comprising a charge-air cooler 1, a cooling radiator 2, a coolant pump 3, a coolant line 4, a drain device 5, and an internal combustion engine 6. The internal combustion engine 6, may further comprise at least one cylinder 7, an exhaust-gas after treatment unit 8, a low-pressure exhaust-gas recirculation (low-pressure EGR) arrangement 9, and a turbocharger 10 which may generate charge-air with an increased pressure.

The system 20 may also include an exhaust tract 11 and an intake tract 12. By means of an exhaust-gas recirculation valve 13, exhaust gas from within the EGR arrangement 9 may be conducted into and through an intake tract 12 and thus, into the charge-air.

The charge-air cooler 1 of one example embodiment uses water as the coolant fluid (water-cooled charge-air cooler, WCCAC). The charge-air cooler could alternatively in some examples, be cooled with air or a combination of air and water. In some embodiments, the use of air as a coolant fluid may serve only as an additional source of cooling, wherein the charge-air cooler receives a majority of the cooling from water. Further, in this example of a charge-air cooler cleaning system, the coolant pump 3 may be an electrically driven pump. The coolant pump may alternatively also be driven in some other way. For example, the coolant pump 3 may be a hydraulic pump.

From the charge-air cooler 1, a compressed and cooled charge-air flow may be transported via an intake connector 14 to at least one cylinder 7 of the internal combustion engine 6. The collected condensate may then be likewise transferred via the intake connector 14 from the charge-air cooler 1 into the cylinder(s) 7.

A drain device 5 may be arranged at a low-lying point of the charge-air cooler 1 and may, in some embodiments, be positioned at the lowest lying point thereof. The drain device 5 may be actuated by way of a control mechanism or actuator and may further be configured to be opened manually. In order to receive a signal for mechanical opening, the drain device 5 may be connected to a control device 17.

The control device 17 also referred to as the controller herein, receives signals from the various sensors 15, 16, 102, 104 of FIG. 1 and employs the various actuators 18 of FIG. 1 to adjust system 20 operation based on the received signals and instructions stored on a memory of the controller. For example, adjusting the drain device 5 may include adjusting an associated actuator 18 of the drain device 5 in order to adjust the drain 5 by way of opening or closing the drain valve.

The controller 17 of FIG. 1 may be a conventional microcomputer for example, and may include a microprocessor unit, input and output ports, read-only memory, random access memory, keep alive memory, and a conventional data bus. The controller 17 is shown receiving various signals from sensors coupled to the vehicle 100 and the engine 6 such as a pH sensor 15, a liquid sensor 16, an ambient temperature sensor 102, and a vehicle speed sensor in some embodiments.

In one example embodiment, the controller 17 may also be configured to transmit received data via a plurality of actuators 18 in order to actuate components of the system 20 such as the drain device 5, the electrical coolant pump 3, and the cooling radiator 2. In some embodiments, the actuators 18 may be solenoid actuators configured to actuate components such as a drain valve of the drain device 5, the electrical coolant pump 3, and/or the cooling radiator 2.

Furthermore, in some embodiments, the charge-air cooler 1 of the disclosed system 20 may comprise at least one pH sensor 15. The provided pH sensor(s) may measure the pH value of condensate that forms within the charge-air cooler 1. The pH sensor(s) 15 may also, in some embodiments, be arranged within a lower lying region of the charge-air cooler 1 because that may be the area in which a majority of condensate collects and a pH value of only an aqueous solution may be detected with some kinds of pH sensors 15.

In the embodiment depicted in FIG. 1, the charge-air cooler 1, may further comprise at least one liquid sensor 16 which may detect the level and/or amount of the condensate formed within the charge-air cooler 1. The liquid sensor 16 may likewise be arranged in a lower lying region of the charge-air cooler, similarly to the pH sensor(s) 15.

FIG. 1 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example.

Instructions for carrying out method for cleaning a charge air cooler and the rest of the methods included herein may be executed by a controller 17 based on instructions stored on a memory of the controller and in conjunction with signals received from sensors of the engine system, such as the sensors described above with reference to FIG. 1. The controller may employ engine actuators of the engine system to adjust engine operation, according to the methods described below.

Figure 2:
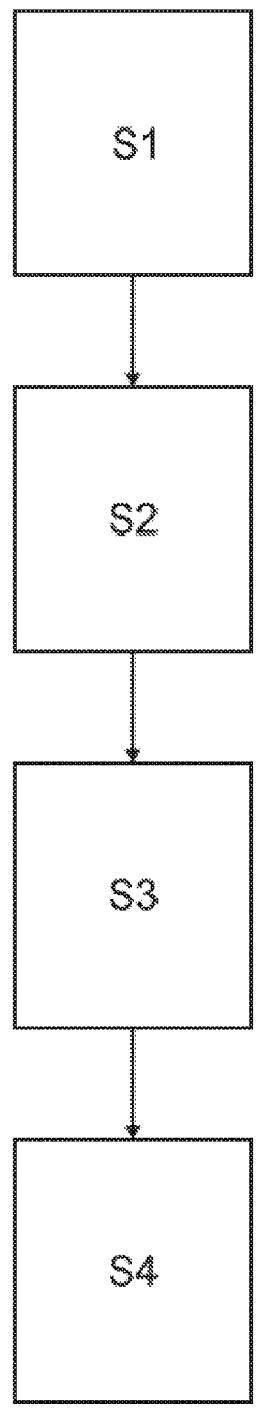
FIG. 2 shows a flow diagram of an embodiment of the method according to the present disclosure.

An example method for cleaning a charge-air cooler to be used with the example system disclosed above is proved in FIG. 2. In one embodiment, a sequence of steps from S1 to S4 may be followed to perform the method of the present disclosure. Specifically, in step S1, by means of a vehicle chronometer in one example, the expiry of a certain operating duration of the internal combustion engine 6, in which the internal combustion engine 6 has actually be operational, since the most recent enhanced cooling of the charge-air cooler 1, is detected. In this step, the operating duration may, in some embodiments be 24 hours, 48 hours, 72 hours, 96 hours, or 120 hours for example.

Alternatively, in step S1, the expiry of a certain time period may be detected regardless of the operating duration. Here, the time period between two enhanced cooling events may preferably amount to one week of running time, two weeks of running time, three weeks of running time, or four weeks of running time for example.

Furthermore, in step S1, the pH value of a formed condensate within the charge-air cooler 1 may be detected by way of a pH sensor 15. A critical pH value for a requirement for enhanced cooling may be in the range from 3.0 to about 2.0. The pH value measurement(s) may be combined with the time measurements in some example embodiments such that after the expiry of a first time at a certain pH value, the enhanced cooling of the charge-air cooler 1 may be performed. However, the enhanced cooling of the charge-air cooler may only be initiated after the expiry of a second time in which the certain pH value has not yet been reached.

Furthermore, by means of corresponding sensors, the ambient temperature and/or the traveling speed of the vehicle may be detected. Subsequent to the detection of the vehicle's speed and ambient temperature, the enhanced cooling may be implemented if the ambient temperature is low and/or the traveling speed is high. When under these particular conditions, a particularly effective cooling operation of the coolant, and thus, the charge-air cooler 1 is made possible.

The detected times and/or the detected pH values of the condensate formed within the charge-air cooler are/is also detected and evaluated in step S2 of the flow diagram of FIG. 2 by a regulation unit (not shown). The decision as to whether enhanced cooling of the charge-air cooler 1 should be performed or not, may then be transmitted to a control unit. In step S3, the control unit may transmit a control command to the cooling radiator 2 in order to perform enhanced cooling of the cooling water. That is to say, the control unit may realize and determine the best possible cooling of the charge-air cooler 1. The cooling radiator 2 may then be activated thereupon. The best possible cooling effect may then be attained by way of high-level cooling. For example, the best possible cooling effect may be achieved by high power of the cooling radiator 2, or in other embodiments, by virtue of the charge-air cooler 1 being cooled over a longer period of time.

Here in step S3, the level of the condensate within the charge-air cooler may be measured by way of a provided liquid sensor 16. If a certain, predetermined level of the condensate has been reached, after a corresponding command of the control unit in subsequent step S4, the drain device 5 may then be opened such that the condensate may drain out. Alternatively, the condensate may be transferred via the intake connector 14 into the cylinders of the internal combustion engine and may be removed from the system 20 via the provided exhaust tract 11.

Figure 3:
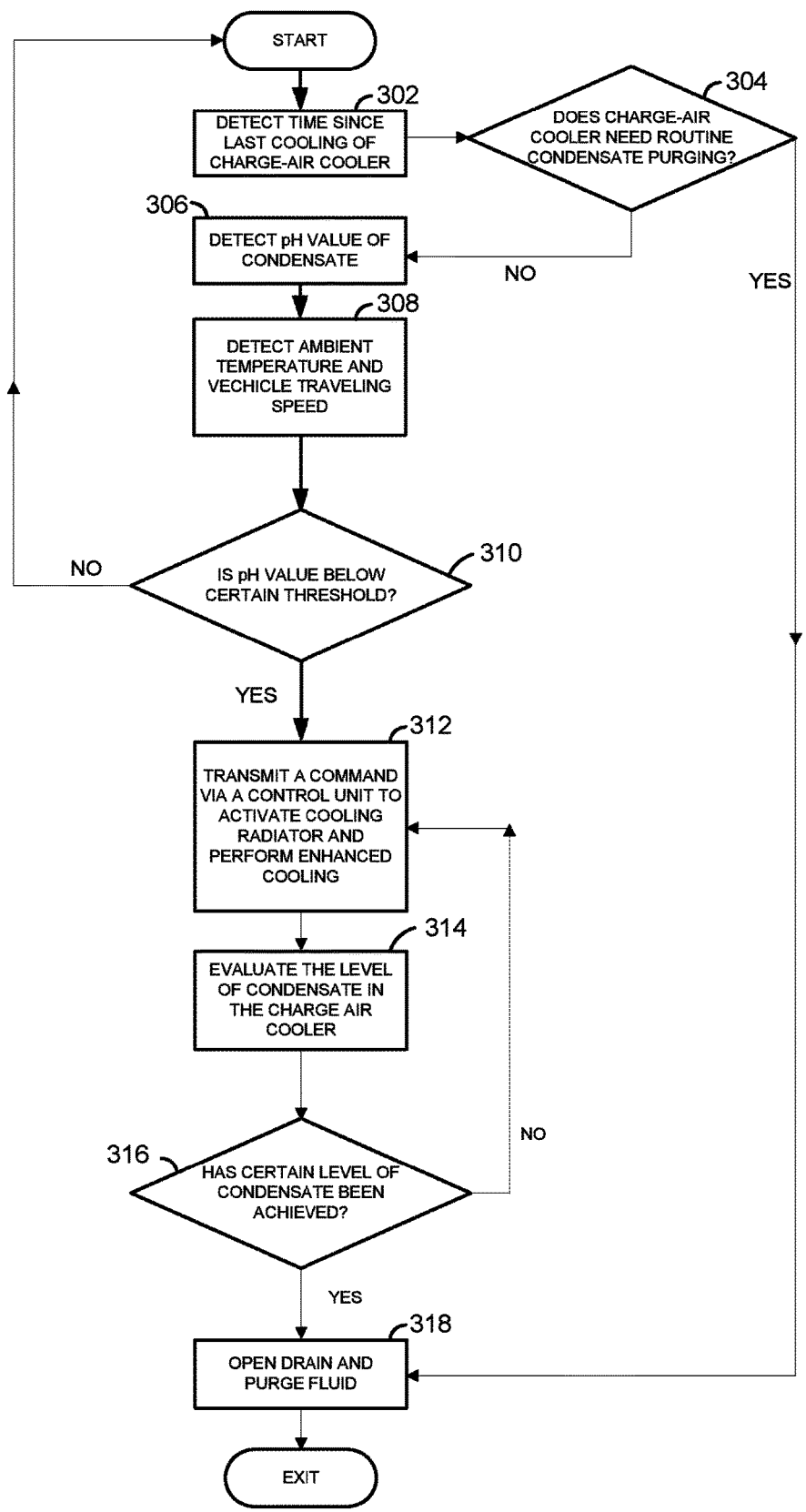
FIG. 3 shows a flow diagram illustrating the processes of a method for cleaning a charge-air cooler.

Turning now to FIG. 3, a flow diagram illustrating an example method for cleaning a charge-air cooler is provided. Similarly to the diagram of FIG. 2, to begin the charge-air cooler cleaning process, a vehicle chronometer may be used to determine the last time that an enhanced cooling operation on the charge-air cooler was performed in block 302. The process then continues onward to decision block 304. In this block of the process, the system may analyze data supplied by a vehicle chronometer for example, in order to determine if routine condensate purging of the charge-air cooler needs to be performed. A process of "routine condensate purging" in this instance may refer to preventative maintenance that may occur after the expiration of a certain predetermined amount of time. In one example embodiment, when the system determines in decision block 304 that the time between enhanced cooling and therefore charge-air cooler cleaning has been too long, the system may continue onward to block 318 and purge the fluid within the charge-air cooler regardless of operating duration and/or conditions. For example, an enhanced cooling and cleaning process of the charge-air cooler may be performed on a weekly basis in one embodiment. It will be appreciated that the predetermined amount of time, after the expiration of which a routine condensate purging process is performed, may be changed or adjusted based on the driving environment or driving conditions experienced by the vehicle 100 for example. In this way, energy required by the enhanced cooling process may be conserved for when the process is necessary to be conducted.

Once the system has determined the time of the last performed enhanced cooling operation and the system 20 has determined that routine condensate purging may not be necessary at decision block 304, the process may continue onward to block 306 in which the system may detect by way of a pH sensor 15, the pH value of the condensate within the charge-air cooler. In one embodiment, a critical pH value which may require an enhanced cooling process is between 3.0 and 2.0. It will be appreciated that the pH value measurements may be combined with the time measurements obtained in block 302 such that after an expiration of a first time at a specific pH value, the enhanced cooling of the charge-air cooler may be performed, but only after the expiration of a second time in which the certain pH value is not achieved.

A subsequent step in the process, block 308, may further include detecting the ambient temperature and/or the speed which the vehicle may be traveling. The determination of vehicle speed and/or ambient temperature may be conducted by way of corresponding sensors such as temperature sensor 102 and vehicle speed sensor 104 for example, and the enhanced cooling process may be implemented in one embodiment if the ambient temperature is relatively low and/or if the traveling speed is relatively high. Under such conditions of high speed and/or low ambient temperature, a particularly effective cooling of the coolant fluid may be performed. For example, if the ambient temperature is low, the coolant fluid may be cooled faster or may require less energy to cool relative to a scenario in which ambient temperature is relatively high.

Once the system has determined the time of the last cooling event, the pH value of the condensate within the charge-air cooler, the ambient temperature, and the vehicle speed, at blocks 302, 304, 306, and 308, a determination at decision block 310 is made as to whether or not the condensate within the charge-air cooler is below a certain predetermined threshold value.

If the condensate within the charge-air cooler has not yet reached or crossed a certain pH value threshold, the method may return back to the start and may perform the steps described above with reference to blocks 302-310 in response to a signal from the control device without opening the drain and purging fluid, and without activating the cooling radiator. For example, in one embodiment, once blocks 302 through 308 have been carried out, at block 310, the method may cycle back to start of the process and may continue the cycle once for every predetermined period of time if the pH value is not at or below the predefined pH threshold value. As a further example, if the system determines that a pH value of the condensate within the charge-air cooler is not at or below the predetermined threshold value, the method may cycle from block 302 down through block 310 and may repeat the same cycle from 302 to 3010 and back to 302 once every 10 to 20 minutes or until the pH sensor indicates that the pH of the condensate is at or below the predetermined threshold pH value. It will be appreciated that the cycle time of the process between steps 302 and 310 may be variable and may be adjusted based on driving environment or driving conditions detected or determined by the controller, for example. In this way energy necessary to perform the enhanced cooling process and subsequently the purging process may be conserved.

Once the system has determined that the condensate within the charge-air cooler is at or below a certain pH threshold value, the process may proceed onward to block 312 in which a signal may be transmitted from a control unit 17 to an actuator 18 in order to activate the cooling radiator 2 and initiate the enhanced cooling process. Once the enhanced cooling process has been initiated, the process may continue on to block 314 in which the system may evaluate, by way of a liquid sensor 16, if the level of condensate within the charge-air cooler is substantial enough to perform an effective purging operation. At decision block 316, if the system determines that the level of condensate within the charge-air cooler is not enough to perform an effective purge operation, the process may then return from block 316 to block 312 and may repeat blocks 312-316 until a certain predetermined level of condensate is achieved.

If the system determines at block 316 that the level of condensate in the charge-air cooler is substantial enough to perform an effective purging operation, the process may proceed onward to block 318 in which the system may open the valve of a drain device 5 via an actuator 18 controlled by a controller 17. Once the purging process is complete, the method process may be completed and the method may conclude.

In this way, the method may improve cooling because, owing to the enhanced cooling, the water that is present in the gaseous state or in droplet form within the charge-air cooler is condensed, and furthermore, with the condensate that is present, as it runs off under the action of the force of gravity into the lower region of the charge-air cooler, condensation water may be purged from the charge-air cooler, and in the process, substances with a potentially corrosive action may be washed out. The method may be further useful, owing to the removal of condensate in the shut down state of the motor vehicle; no condensation water may pass from the charge-air cooler to the inlet valves which may result in undesirable starting drawbacks and/or engine damage. In some embodiments, water is the coolant fluid.

An example technical effect of performing the enhanced cooling of the charge-air cooler via deactivation of the EGR arrangement is that the substances with the potentially most corrosive action tend to originate from the exhaust-gas after treatment process, and said substances pass into the charge-air cooler during the course of the EGR process. In this way, during the removal of substances with a corrosive action, it may be useful to deactivate the EGR such that no new substances with a potentially corrosive action may pass into the charge air cooler.

An additional technical effect of providing at least one pH sensor to be arranged in the charge-air cooler is that it may be possible for the formation of acids within the charge-air cooler, resultant from condensation water and for example, sulfur compounds in the recirculated exhaust gas, to be detected by way of the pH sensor(s) and, in the event of a certain pH threshold value being achieved, the enhanced cooling of the charge-air cooler to be implemented. In this way, the formation of corrosive compounds within the charge-air cooler may be reduced or avoided.

A further aspect of the present disclosure relates to a system for carrying out a method for draining condensation water from a charge-air cooler. In one example, a drain device for draining condensate that has formed within the charge-air cooler may be arranged at a low-lying point in the charge-air cooler such that condensate may collect there and thus, may hold substances with a corrosive action in solution before being drained or discharged. An example technical effect of providing a drain device at a low-lying point of the charge-air cooler is that when the cooler is to be drained, the force of gravity may be the only force needed to act on the fluid in order to be discharged. For this purpose, the drain device may be further configured to be closable such that it may be opened by a controller or manually. It will be understood that as used herein, the term "low" refers to a lowermost point in relation to the vertical axis of the motor vehicle.

As one embodiment, a method for cleaning a water-cooled charge-air cooler for an internal combustion engine with an exhaust-gas recirculation arrangement wherein a cooler device which is connected via a coolant circuit to the charge-air cooler includes imparting a cooling effect through enhanced cooling of the charge-air cooler. In a first example of the method, the cooling effect of the charge-air cooler is imparted over a period of time until a maximum possible amount of water in gaseous and/or droplet form in the charge-air cooler has turned into condensate. A second example of the method may optionally include the first example and further includes, wherein enhanced cooling of the charge-air cooler is performed in the presence of low ambient temperatures. In a third example of the method, which may optionally include any of the first and second examples, the example method further includes wherein the enhanced cooling of the charge-air cooler is performed at high vehicle speeds. A fourth example of the method may optionally include any of the first through third examples and further includes wherein the maximum cooling of the charge-air cooler is performed with deactivation of the exhaust-gas recirculation arrangement. A fifth example of the method may optionally include any of the first through fourth examples, and further comprises wherein the enhanced cooling of the charge-air cooler is performed when a certain operating duration of the internal combustion engine has been reached. A sixth example of the method may optionally include any of the first through fifth examples and further includes wherein the enhanced cooling of the charge-air cooler is performed when a certain pH value in the charge-air cooler has been reached. A seventh example of the method may optionally include any of the first through sixth examples an further comprises, wherein the condensate formed within the charge-air cooler is transported via an intake connector from the charge-air cooler to at least one cylinder of the internal combustion engine. A further example of the method may optionally include any of the first through seventh examples and may further include, wherein the condensate is discharged from the charge-air cooler via a drain device arranged at a low-lying point in the charge-air cooler.

In another representation a further aspect of the present disclosure relates to a motor vehicle having a system for draining condensation water according to the methods and systems described above. As an example, a system for carrying out a method for draining the condensate from a charge air cooler as described above may be provided. In one example, the system may comprise a drain device for the discharge of condensate that has formed and is arranged in the charge-air cooler. The embodiment may further comprise a water-cooled charge-air cooler, a cooling radiator for the coolant fluid, a coolant pump and a coolant line that runs between the cooling radiator and the charge-air cooler. A second example may optionally include the first example and further comprises wherein at least one pH sensor is arranged in the charge-air cooler.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for cleaning a water-cooled charge-air cooler for an internal combustion engine by transporting or discharging condensate, the engine comprising an exhaust-gas recirculation arrangement, wherein a cooler device connected via a coolant circuit to the charge-air cooler imparts a cooling effect through enhanced cooling of the charge-air cooler, wherein the enhanced cooling of the charge-air cooler is performed with deactivation of the exhaust-gas recirculation arrangement.

2. The method of claim 1, wherein the cooling effect is imparted over a period of time until a predetermined amount of water in gaseous and/or droplet form in the charge-air cooler has turned into a condensate based on an output of a liquid sensor arranged in a lower lying region of the charge-air cooler, and wherein the predetermined amount of water is a level of condensate sufficient to perform cleaning of the charge-air cooler.

3. The method of claim 1, wherein enhanced cooling of the charge-air cooler is performed in the presence of low ambient temperatures.

4. The method of claim 1, wherein the enhanced cooling of the charge-air cooler is performed at high vehicle speeds.

5. The method of claim 1, wherein the enhanced cooling of the charge-air cooler is performed when a certain operation duration of the internal combustion engine has been reached.

6. The method of claim 1, wherein the enhanced cooling of the charge-air cooler is performed when a certain pH value within the charge-air cooler has been reached.

7. The method of claim 2, wherein the condensate is transported via an intake connector from the charge-air cooler to at least one cylinder of the internal combustion engine.

8. The method of claim 2, wherein the condensate is discharged from the charge-air cooler via a drain device arranged at a low-lying point in the charge-air cooler.

9. A method for cleaning a water-cooled charge-air cooler for an internal combustion engine, the engine comprising an exhaust-gas recirculation arrangement, wherein a cooler device connected via a coolant circuit to the charge-air cooler imparts a cooling effect through enhanced cooling of the charge-air cooler, wherein the enhanced cooling of the charge-air cooler is performed when a certain pH value within the charge-air cooler has been reached.

* * * * *